M. F. SHUYLER.
NUT LOCK.
APPLICATION FILED MAR. 2, 1917.
1,270,224.
Patented June 18, 1918.
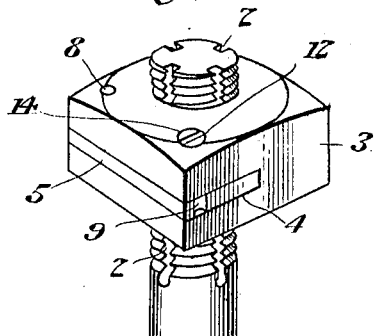
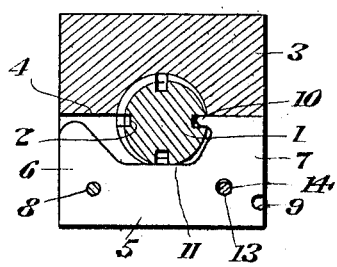
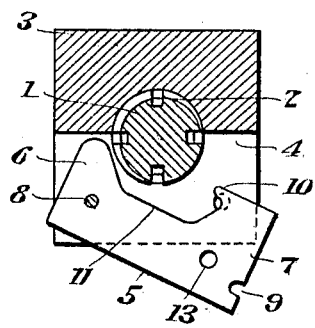
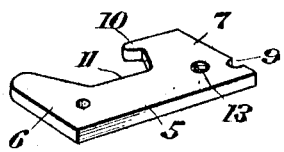
WITNESS
INVENTOR
M. F. Shuyler
BY Victor J. Evans
ATTORNEY

UNITED STATES PATENT OFFICE.

MILLARD F. SHUYLER, OF ST. LOUIS, MISSOURI, ASSIGNOR OF ONE-HALF TO THOMAS F. MAGUIRE, OF ST. LOUIS, MISSOURI.

NUT-LOCK.

1,270,224.  Specification of Letters Patent.  Patented June 18, 1918.

Application filed March 2, 1917. Serial No. 152,082.

*To all whom it may concern:*

Be it known that I, MILLARD F. SHUYLER, a citizen of the United States, residing at St. Louis, in the State of Missouri, have invented new and useful Improvements in Nut-Locks, of which the following is a specification.

The present invention relates to improvements in means for locking a nut upon a bolt, and resides in the construction and operative arrangement of parts hereinafter described and claimed.

The object of the invention is to produce a locking means between a nut and bolt which shall be comparatively simple in construction, easily operated to lock the nut upon the bolt and which also provides for the turning of the nut upon the bolt in either direction, when it is not desired that the nut and bolt be locked, or when the nut is being screwed home upon the bolt.

In the drawing:

Figure 1 is a perspective view illustrating a nut and bolt constructed and locked in accordance with the present invention, Fig. 2 is a sectional view taken in a line with the locking member, Fig. 3 is a similar view but illustrating the locking member swung out of engagement with the nut to permit of the turning of the nut and bolt, and Fig. 4 is a perspecive view of the locking member.

In the drawing the numeral 1 designates a bolt of any ordinary construction which has its threaded shank provided with longitudinal grooves 2, and the said grooves are preferably arranged at right angles with respect to each other, so that the shank is provided with four of the said grooves.

The numeral 3 designates the nut which is adapted to be screwed upon the bolt. In the present instance the nut is cut or slitted centrally from one of its sides to the other side for approximaely one-half of the diameter of the said nut so that the slot 4 opens into the bore of the nut.

The numeral 5 designates the locking member. This member is constructed from a flat plate of a length and thickness to be snugly received in the slot 4 and the said plate has both of its ends widened, as at 6 and 7, a pivot member 8 passing through the plate 5 at the juncture of the widened portion 6 therewith so that the member 5 is pivotally connected with the nut and is designed, when brought to bolt-engaging position to have its outer edge arranged flush with one of the sides of the nut. The widened portion 7 at the outer edge thereof is notched, as at 9, whereby to receive a suitable instrument to permit of the same being swung outwardly of the nut when the nut is being screwed home upon the bolt or being unscrewed from the bolt, as illustrated in Fig. 3 of the drawings. The widened portion 7 terminates in an inturned reduced portion providing a tooth 10, and by reference to Fig. 2 of the drawings it will be noted that when the device is swung to permit of the tooth being received in one of the grooves 2 of the bolt, the inner edge of the reduced body portion indicated by the numeral 11 will contact with the shank of the bolt to the opposite sides of one of the grooves, and this contacting engagement of the said member with the said bolt effects in holding the nut in locked position upon the bolt. The bolt, upon its outer face, is provided with an opening 12, and the locking member, upon its widened portion 7, and approximately in a line with its tooth 10 is provided with a threaded opening or depression 13, and the numeral 14 designates a headed screw which is adapted to be passed through the opening 12 and to engage with the threads in the opening or depression 13 to lock the member 5 in coengaging position.

Having thus described the invention, what I claim is:

In combination with a bolt having its shank provided with longitudinally extending right angularly disposed grooves, and a nut for the bolt, of a locking plate having both of its ends widened and one of its widened ends pivotally connected with the nut, its other widened end terminating in an inturned tooth which is adapted to engage in one of the grooves of the bolt and the inner edge of the plate adapted to frictionally contact with the shank of the bolt when the said tooth is in such engaging position, and means comprising a threaded element for locking the plate upon the nut in bolt-engaging position.

In testimony whereof I affix my signature.

MILLARD F. SHUYLER.

Copies of this patent may be obtained for five cents each, by addressing the "Commissioner of Patents, Washington, D. C."